United States Patent
Stilin

(10) Patent No.: US 11,215,054 B2
(45) Date of Patent: Jan. 4, 2022

(54) AIRFOIL WITH ENCAPSULATING SHEATH

(71) Applicant: United Technologies Corporation, Farmington, CT (US)

(72) Inventor: Nicholas D. Stilin, Higganum, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 132 days.

(21) Appl. No.: 16/668,820

(22) Filed: Oct. 30, 2019

(65) Prior Publication Data

US 2021/0131286 A1 May 6, 2021

(51) Int. Cl.
*F02C 3/04* (2006.01)
*F01D 5/02* (2006.01)

(52) U.S. Cl.
CPC .............. *F01D 5/021* (2013.01); *F02C 3/04* (2013.01); *F05D 2220/32* (2013.01); *F05D 2230/60* (2013.01); *F05D 2240/24* (2013.01); *F05D 2240/30* (2013.01)

(58) Field of Classification Search
CPC ........ F01D 5/021; F02C 3/04; F05D 2220/32; F05D 2230/60; F05D 2240/24; F05D 2240/30
See application file for complete search history.

(56) References Cited

U.S. PATENT DOCUMENTS

| 2,615,236 A | * | 10/1952 | Stulen | B23K 31/02 |
| | | | | 29/889.72 |
| 4,111,600 A | * | 9/1978 | Rothman | F01D 5/147 |
| | | | | 416/2 |
| 4,643,647 A | | 2/1987 | Perry | |
| 5,129,787 A | | 7/1992 | Violette et al. | |

(Continued)

FOREIGN PATENT DOCUMENTS

| CA | 395673 | 4/1941 |
| EP | 0735161 | 10/1996 |

(Continued)

OTHER PUBLICATIONS

European Search Report for European Patent Application No. 20205011.8 completed Jan. 21, 2021.

(Continued)

*Primary Examiner* — Justin D Seabe
*Assistant Examiner* — Theodore C Ribadeneyra
(74) *Attorney, Agent, or Firm* — Carlson, Gaskey & Olds, P.C.

(57) ABSTRACT

An airfoil according to an example of the present disclosure includes, among other things, an airfoil section extending between a leading edge and a trailing edge in a chordwise direction and extending between a tip portion and a root section in a spanwise direction. The airfoil section defines pressure and suction sides separated in a thickness direction, and includes a sheath having first and second sheath portions extending along an airfoil body of the airfoil section. The (Continued)

first sheath portion includes a first interface portion, and the second sheath portion includes a second interface portion that cooperates with the first interface portion to establish a joint having a circuitous profile along an edge of the airfoil body. A method of assembly for an airfoil is also disclosed.

20 Claims, 7 Drawing Sheets

(56) References Cited

U.S. PATENT DOCUMENTS

| | | | |
|---|---|---|---|
| 5,791,879 | A | 8/1998 | Fitzgerald et al. |
| 5,839,882 | A | 11/1998 | Finn et al. |
| 5,908,285 | A * | 6/1999 | Graff .................. F04D 29/324 |
| | | | 416/224 |
| 5,908,522 | A * | 6/1999 | Lostrom .............. B64C 11/205 |
| | | | 156/94 |
| 6,039,542 | A | 3/2000 | Schilling et al. |
| 6,524,063 | B1 | 2/2003 | Beyer et al. |
| 6,872,340 | B2 | 3/2005 | Cundiff et al. |
| 7,575,417 | B2 | 8/2009 | Finn et al. |
| 7,828,526 | B2 | 11/2010 | Cairo et al. |
| 7,980,817 | B2 * | 7/2011 | Foose .................. F01D 5/147 |
| | | | 415/191 |
| 8,241,003 | B2 | 8/2012 | Roberge |
| 8,348,622 | B2 | 1/2013 | Bech |
| 9,121,294 | B2 * | 9/2015 | Kray .................... F01D 5/282 |
| 9,598,966 | B2 * | 3/2017 | Klein ................... F01D 5/282 |
| 9,765,634 | B2 * | 9/2017 | Fameau ............... F01D 5/147 |
| 10,030,522 | B2 * | 7/2018 | Benson ............... F01D 21/045 |
| 10,174,625 | B2 * | 1/2019 | Benson ................ F02C 7/05 |
| 10,677,259 | B2 * | 6/2020 | Jain ..................... F04D 29/324 |
| 2005/0180854 | A1 | 8/2005 | Grabau et al. |
| 2008/0181766 | A1 | 7/2008 | Campbell et al. |
| 2010/0322760 | A1 | 12/2010 | Morrison |
| 2011/0033308 | A1 * | 2/2011 | Huth ................... F04D 29/023 |
| | | | 416/229 R |
| 2011/0116906 | A1 * | 5/2011 | Smith .................. B64C 11/205 |
| | | | 415/1 |
| 2011/0182740 | A1 * | 7/2011 | Klinetob ............. F01D 5/147 |
| | | | 416/224 |
| 2011/0194941 | A1 | 8/2011 | Parkin et al. |
| 2012/0301292 | A1 * | 11/2012 | Deal .................... F04D 29/324 |
| | | | 415/220 |
| 2013/0008027 | A1 * | 1/2013 | Franchet ............. B23K 20/021 |
| | | | 29/889.71 |
| 2013/0039774 | A1 | 2/2013 | Viens et al. |
| 2013/0064676 | A1 | 3/2013 | Salisbury et al. |
| 2013/0167555 | A1 | 7/2013 | Schwarz et al. |
| 2013/0239586 | A1 * | 9/2013 | Parkin ................. F04D 29/324 |
| | | | 60/805 |
| 2017/0268349 | A1 | 9/2017 | Bryant, Jr. et al. |

FOREIGN PATENT DOCUMENTS

| | | |
|---|---|---|
| EP | 1481747 | 12/2004 |
| EP | 1939401 | 7/2008 |
| EP | 2253806 | 11/2010 |
| EP | 2362066 | 8/2011 |
| EP | 2458153 | 5/2012 |
| EP | 2607628 | 6/2013 |
| EP | 2693061 | 2/2014 |
| EP | 2772615 | 9/2014 |
| EP | 3196427 | 7/2017 |
| EP | 3222815 | 9/2017 |
| EP | 3282090 | 2/2018 |

OTHER PUBLICATIONS

International Search Report and Written Opinion for PCT Application No. PCT/US2014/050614 completed Nov. 19, 2014.
Extended European Search Report for European Patent Application No. 14842050.8 completed May 9, 2017.
International Preliminary Report on Patentability for PCT Application No. PCT/US2014/050614 completed Mar. 15, 2016.
European Search Report for European Patent Application No. 20204160.4 completed Jan. 29, 2021.

* cited by examiner

AIRFOIL WITH ENCAPSULATING SHEATH

BACKGROUND

This disclosure relates to a gas turbine engine, and more particularly to an airfoil having a sheath.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

The fan can include an array of fan blades each having a main body that establishes an aerodynamic surface contour. The main body may be formed from a composite material made of a layup of one or more laminated layers. One or more sheaths may be secured to the main body to reduce a likelihood delamination of the layup due to a bird strike or other foreign object debris (FOD) event.

SUMMARY

An airfoil for a gas turbine engine according to an example of the present disclosure includes an airfoil section extending between a leading edge and a trailing edge in a chordwise direction and extending between a tip portion and a root section in a spanwise direction, and the airfoil section defining pressure and suction sides separated in a thickness direction. A sheath includes first and second sheath portions secured to an airfoil body of the airfoil section. The first sheath portion includes a first sheath body and a first set of interface members. The first sheath body extends along a first face of the airfoil body, and the first set of interface members extend from the first sheath body and along a second face of the airfoil body. The second sheath portion includes a second sheath body and a second set of interface members. The second sheath body extends along the second face, and the second set of interface members extend from the second sheath body and along the first face such that the second set of interface members are interleaved with the first set of interface members to establish a joint having a circuitous profile along an edge of the airfoil body joining the first and second faces.

In a further embodiment of any of the foregoing embodiments, the airfoil body comprises a composite material.

In a further embodiment of any of the foregoing embodiments, the first and second sheath portions are metallic.

In a further embodiment of any of the foregoing embodiments, the joint is established along an external surface of the airfoil section.

In a further embodiment of any of the foregoing embodiments, each of the first and second sheath bodies includes a first body portion and a second body portion extending transversely from the first body portion. The first body portion has a major component extending in the chordwise direction along the tip portion, and the second body portion has a major component extending in the spanwise direction along the trailing edge, and the first and second sets of interface members extend outwardly from the respective second body portion.

In a further embodiment of any of the foregoing embodiments, terminal ends of the first set of interface members are received in respective recesses between adjacent pairs of the second set of interface members such that the first set of interface members are at least partially aligned with the second set of interface members relative to the chordwise direction and relative to the radial direction along the trailing edge.

In a further embodiment of any of the foregoing embodiments, the pressure side comprises the first face, the suction side comprises the second face, and the joint is established along the trailing edge.

In a further embodiment of any of the foregoing embodiments, the first and second sets of interface members have a hook-shaped geometry including a first portion having a major component extending from a respective one of the first and second sheath bodies toward the trailing edge and including a second portion having a major component extending from the first portion toward the leading edge, and the first portion is opposed to the second portion to establish a recess receiving a portion of the airfoil body along the edge.

In a further embodiment of any of the foregoing embodiments, the first and second sheath portions cooperate to establish a sheath cavity dimensioned to receive a portion of the airfoil body along the tip portion. The first and second sheath portions cooperate to establish the pressure and suction sides.

In a further embodiment of any of the foregoing embodiments, the airfoil is a fan blade.

A gas turbine engine according to an example of the present disclosure includes a fan section that has a fan having a fan hub carrying a plurality of fan blades, a turbine section that has a fan drive turbine rotatably coupled to the fan, and a compressor section driven by the turbine section. Each fan blade of the plurality of fan blades includes an airfoil section extending between a leading edge and a trailing edge in a chordwise direction and extending between a tip portion and a root section in a spanwise direction. The airfoil section defines pressure and suction sides separated in a thickness direction, and includes a sheath having first and second sheath portions extending along an airfoil body of the airfoil section. The first sheath portion includes a first interface portion, and the second sheath portion includes a second interface portion that cooperates with the first interface portion to establish a joint having a circuitous profile along an edge of the airfoil body.

In a further embodiment of any of the foregoing embodiments, the first and second sheath portions cooperate to establish a sheath cavity dimensioned to receive a portion of the airfoil body, and the joint is established along a trailing edge of the airfoil section.

In a further embodiment of any of the foregoing embodiments, the first interface portion includes a first set of interface members dimensioned to wrap in a first direction about the edge of the airfoil body adjacent the trailing edge, and the second interface portion includes a second set of interface members dimensioned to wrap in a second direction about the edge of the airfoil body such that the second set of interface members are interleaved with the first set of interface members to establish the joint.

In a further embodiment of any of the foregoing embodiments, the airfoil body comprises a composite material received in an elongated groove established by the first and second sets of interface members, and the first and second sheath portions are metallic.

In a further embodiment of any of the foregoing embodiments, the circuitous profile has a plurality of segments extending between the pressure and suction sides at respective span positions of the trailing edge.

A method of assembly for an airfoil according to an example of the present disclosure includes securing a first sheath portion to a first face of an airfoil section, the first sheath portion having a first set of interface members, and securing a second sheath portion to a second face of the airfoil section such that a second set of interface members of the second sheath portion are interleaved with the first set of interface members to establish a joint along an edge of the airfoil section joining the first and second faces.

In a further embodiment of any of the foregoing embodiments, the first and second interface members cooperate to substantially encapsulate an airfoil body along a trailing edge of the airfoil section, the airfoil body includes a composite layup at least partially received in an elongated groove established by the first and second sets of interface members, and the first and second sheath portions are metallic.

In a further embodiment of any of the foregoing embodiments, the first and second sets of interface members establish an external surface contour along pressure and suction sides of the airfoil section.

In a further embodiment of any of the foregoing embodiments, the first set of interface members include a first set of recesses, the second set of interface members include a second set of recesses, the step of securing the first sheath portion includes inserting a portion of an airfoil body into the first set of recesses, and the step of securing the second sheath includes inserting the portion of the airfoil body into the second set of recesses.

In a further embodiment of any of the foregoing embodiments, the airfoil section extends in a chordwise direction between leading and trailing edges, and the joint is established along the trailing edge.

The various features and advantages of this disclosure will become apparent to those skilled in the art from the following detailed description. The drawings that accompany the detailed description can be briefly described as follows.

DETAILED DESCRIPTION

Figure 1:
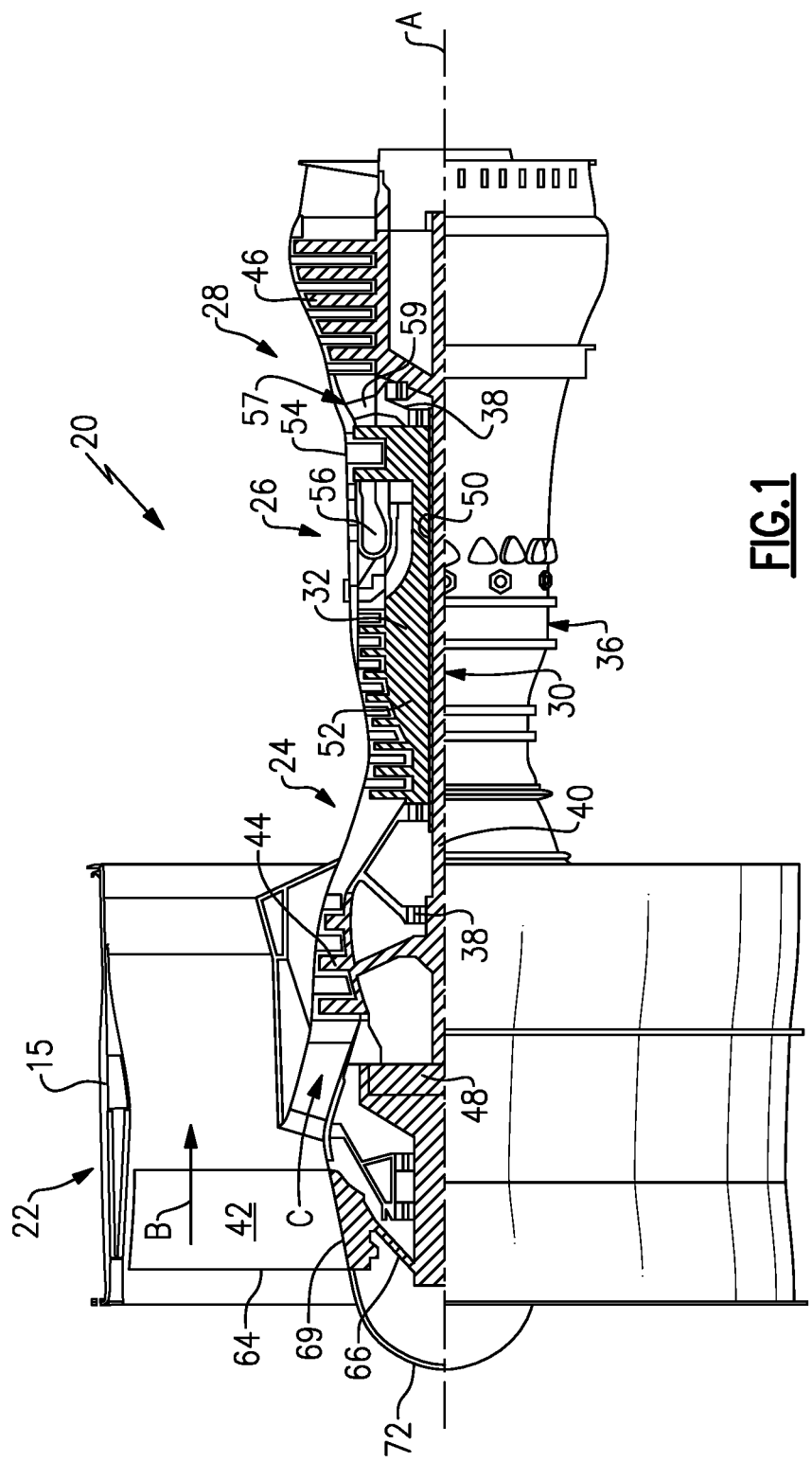
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by 1bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
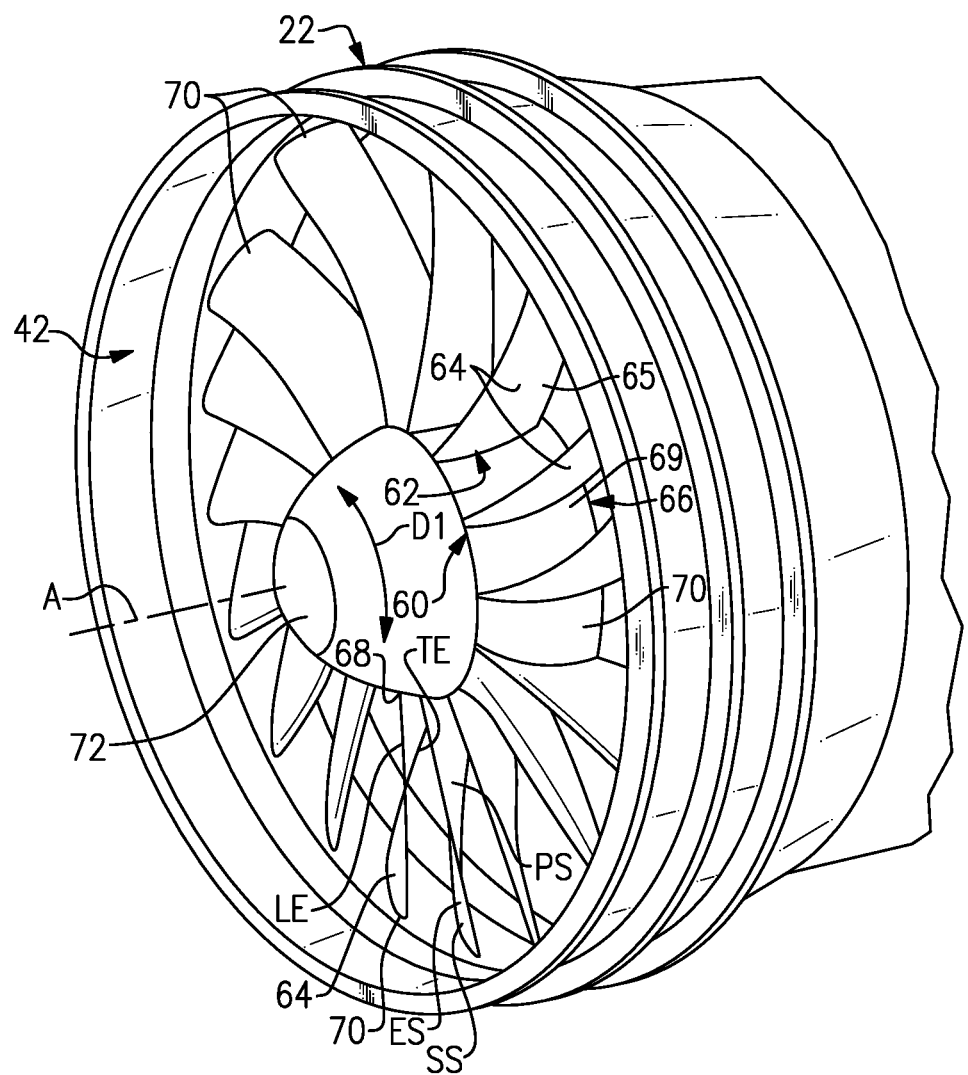
FIG. 2 illustrates a perspective view of a fan section including an array of airfoils.

Referring to FIG. 2, the fan 42 includes a rotor 60 including a fan hub 66 carrying or otherwise supporting a plurality of airfoils or fan blades 64. The fan blades 64 are arranged in an array or row 62 and are circumferentially distributed about the hub 66 (see also FIG. 1). Various numbers of fan blades 64 may be incorporated into the fan 42, such as a total quantity of between 12 and 20 of fan blades 64. The array 62 of fan blades 64 are circumferentially distributed about the engine axis A. The low pressure turbine 46 can be rotatably coupled to the hub 66 of the fan 42. The fan blades 64 are rotatable in a direction D1 about the engine axis A in response to rotation of the hub 66.

The airfoil 64 extends radially outward of a platform 69, which provides the inner flow path. The platform 69 may be integral with the airfoil 64 or separately secured to the hub 66, for example. A nosecone or spinner 72 is supported relative to the hub 66 to provide an aerodynamic inner flow path into the fan section 22, as illustrated in FIGS. 1-2.

Figure 3:
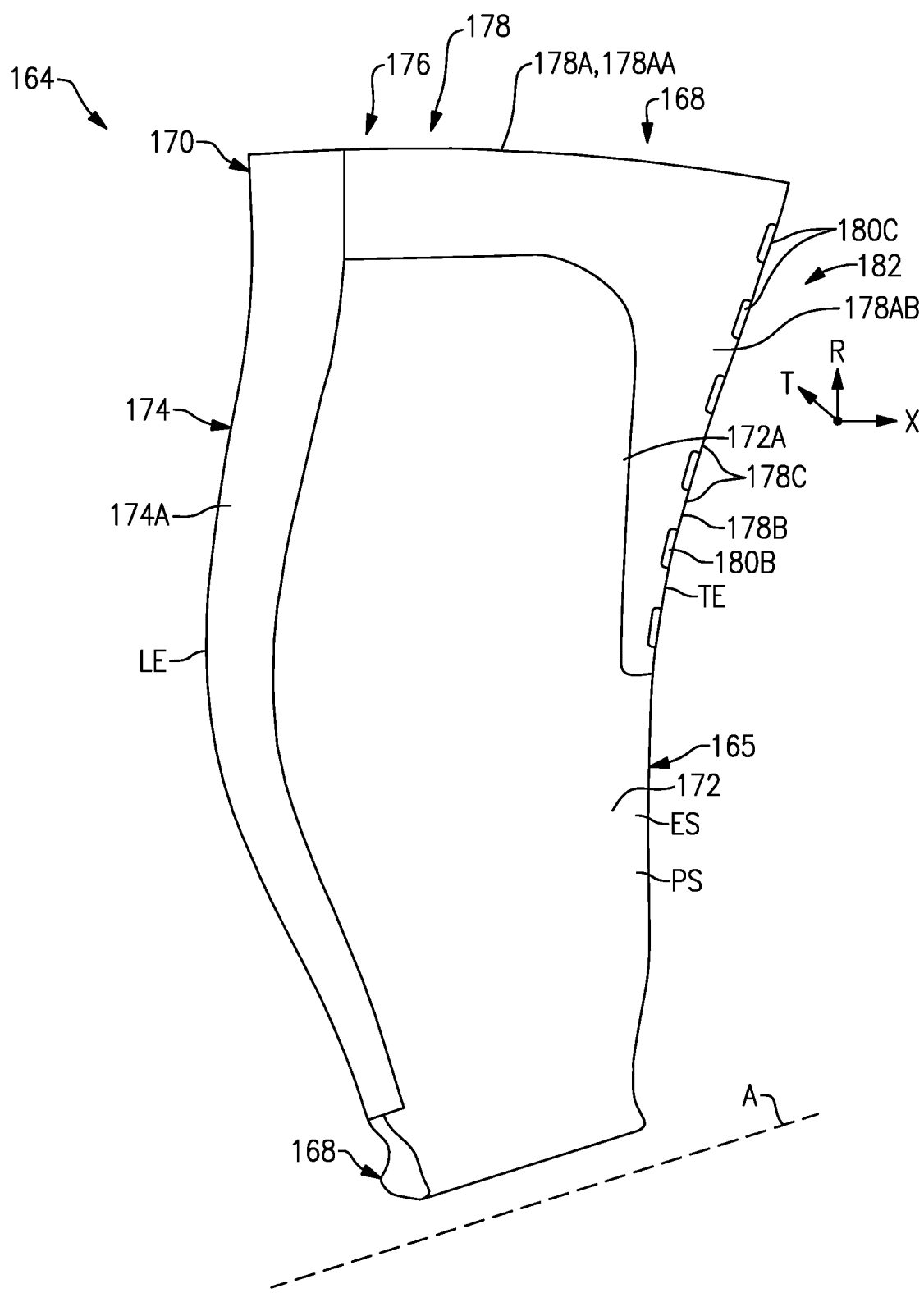
FIG. 3 illustrates a perspective view of an airfoil including a sheath and tip cap.

FIG. 3 illustrates an exemplary airfoil 164 for a gas turbine engine. In this disclosure, like reference numerals designate like elements where appropriate and reference numerals with the addition of one-hundred or multiples thereof designate modified elements that are understood to incorporate the same features and benefits of the corresponding original elements. The airfoil 164 can be a fan blade incorporated into the fan 42 of FIGS. 1-2, for example. It should be understood that other types of airfoils and other parts of the gas turbine engine 20 may benefit from the examples disclosed herein, such as inlet and exit guide vanes and other airfoils in the fan section 22, compressor section 24 and/or turbine section 28.

Referring to FIG. 3, with continuing reference to FIG. 2, the airfoil 164 includes an airfoil section 165 and a root section 168. The root section 168 is received in a correspondingly shaped slot in the hub 66. The root section 168 can have a shape configured to mount the airfoil 164 to the hub 66, such as a dovetail shape.

Figure 4:
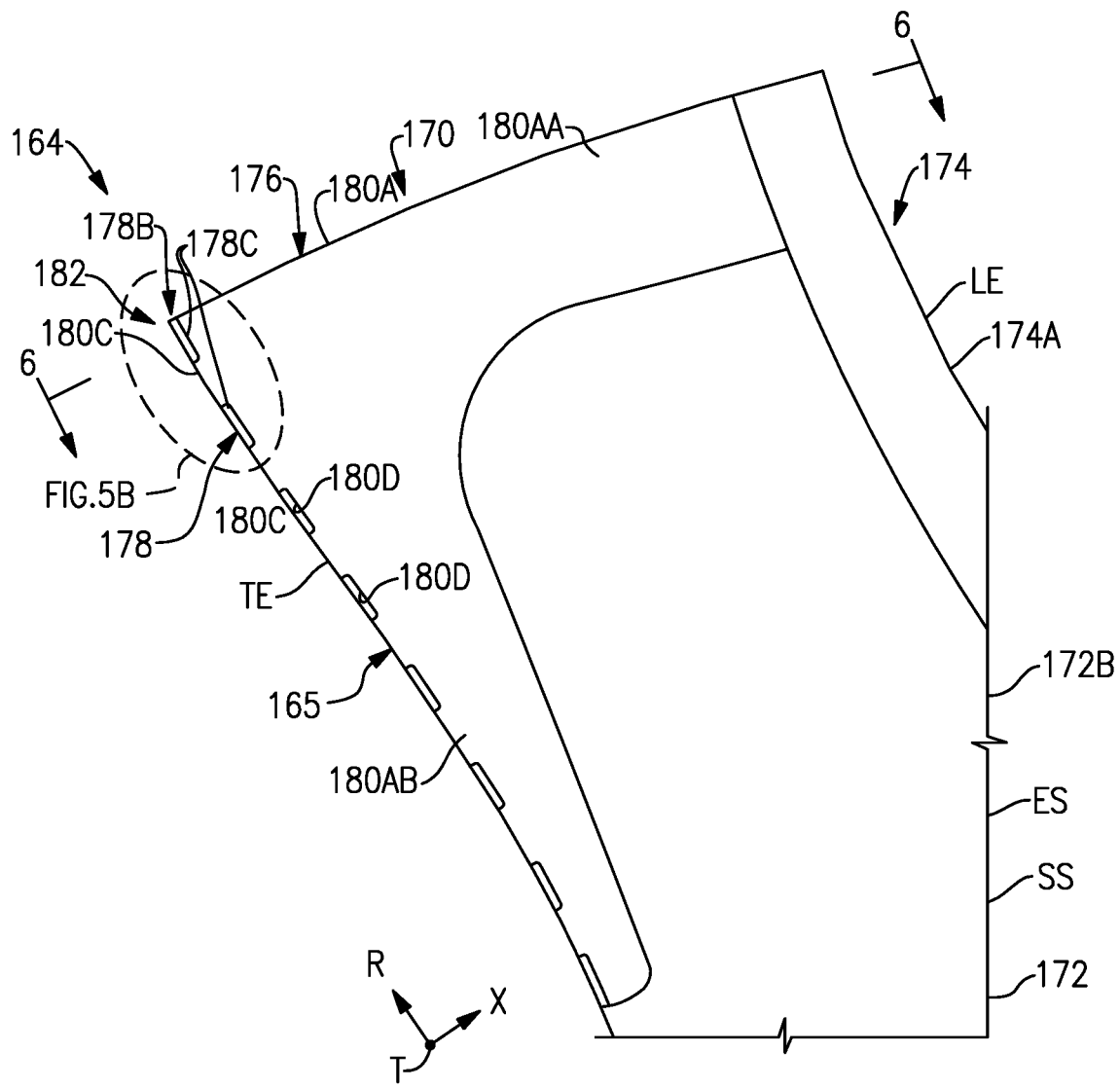
FIG. 4 illustrates a joint established between portions of the tip cap of FIG. 3.

The airfoil section 165 extends in a radial or spanwise direction R between the root section 168 and a tip portion 170, in a chordwise direction X between a leading edge LE and a trailing edge TE, and in a thickness direction T between a pressure side PS and a suction side SS (FIGS. 2 and 4). The tip portion 170 establishes a terminal end of the airfoil 164.

The airfoil section 165 of each airfoil 164 has an exterior surface ES providing an aerodynamic surface contour that extends in the chordwise direction X between the leading and trailing edges LE, TE. The exterior surface ES of the airfoil 164 generates lift based upon its geometry and directs flow along the core flow path C and bypass flow path B. The airfoil 164 may be constructed from a composite material, stainless steel, an aluminum or titanium alloy, or a combination of one or more of these. Abrasion-resistant coatings or other protective coatings may be applied to the airfoil 164.

The airfoil 164 includes a first sheath 174 and a tip cap (or second sheath) 176 secured to the airfoil body 172. The sheath 174 and tip cap 176 are dimensioned to extend along the external surface ES of the airfoil body 172 at various positions and serve to protect the airfoil body 172 from impacts that may occur during engine operation such as bird strikes, ice fragments and other foreign object debris (FOD). In other examples, the sheath 174 is omitted.

Various materials can be utilized to construct the airfoil body 172, such as metallic materials including titanium, aluminum, alloys, and composite materials. In some examples, the airfoil body 172 is constructed from a composite layup that establishes the tip portion 170. The composite layup can include a plurality of plies or layers L (FIGS. 6 and 7A-7B) of composite material. Example composite materials include carbon fibers embedded in a polymer matrix material. Other example composite materials include fiberglass, aramid fibers such as Kevlar®, and polyethylene. The layers L can be made of various constructions such as braided or woven fibers, fabrics, and/or uni-tape plies, for example.

The sheath 174 and tip cap 176 can be arranged at various positions and orientations relative to the airfoil body 172. In the illustrative example of FIGS. 3-4, the sheath 174 has a major component dimensioned to extend in the radial direction R along a periphery of the leading edge LE of the airfoil section 165. The sheath 174 includes a sheath body 174A that extends in the spanwise direction R along both (or at least one) of the pressure and suction sides PS, SS (see also FIG. 6). The sheath body 174A is dimensioned to extend from the tip portion 170 along the leading edge LE towards the root section 168. The sheath body 174A can be dimensioned to extend at least a majority of span positions of the airfoil section 165. In the illustrative example of FIG. 3, the sheath body 174A extends between approximately 0% span and approximately 100% span. For the purposes of this disclosure, 0% span is defined at a junction between the airfoil section 165 and the root section 168, and 100% span is defined at a radially outermost position or terminal end of the tip portion 170. For the purposes of this disclosure, the terms "about" and "approximately" mean±3% of the stated value unless otherwise disclosed.

Referring to FIGS. 3-4, the tip cap 176 includes first and second cap (or sheath) portions 178, 180 secured to and extending along the airfoil body 172. The cap portions 178, 180 can be separate and distinct components. The cap portions 178, 180 can be arranged to be spaced apart from each other to accommodate design and manufacturing tolerances, as illustrated in FIGS. 3-4, or can be arranged to directly abut each other. Separate and distinct cap portions 178, 180 can reduce complexity in cleaning and inspecting the tip cap 176, and can reduce dimensional variations that may otherwise be caused by distortions due to a welding operation. The cap portions 178, 180 cooperate to establish pressure and suction sides PS, SS of the airfoil section 165.

The first and second cap portions 178, 180 include respective first and second cap (or sheath) bodies 178A, 180A, dimensioned to extend along a periphery of the tip portion 170 and/or along a periphery of the trailing edge TE of the airfoil section 165. The cap bodies 178A, 180A are dimensioned to extend in the chordwise direction X along respective ones of the pressure and suction sides PS, SS.

Figures 5A, 5B:
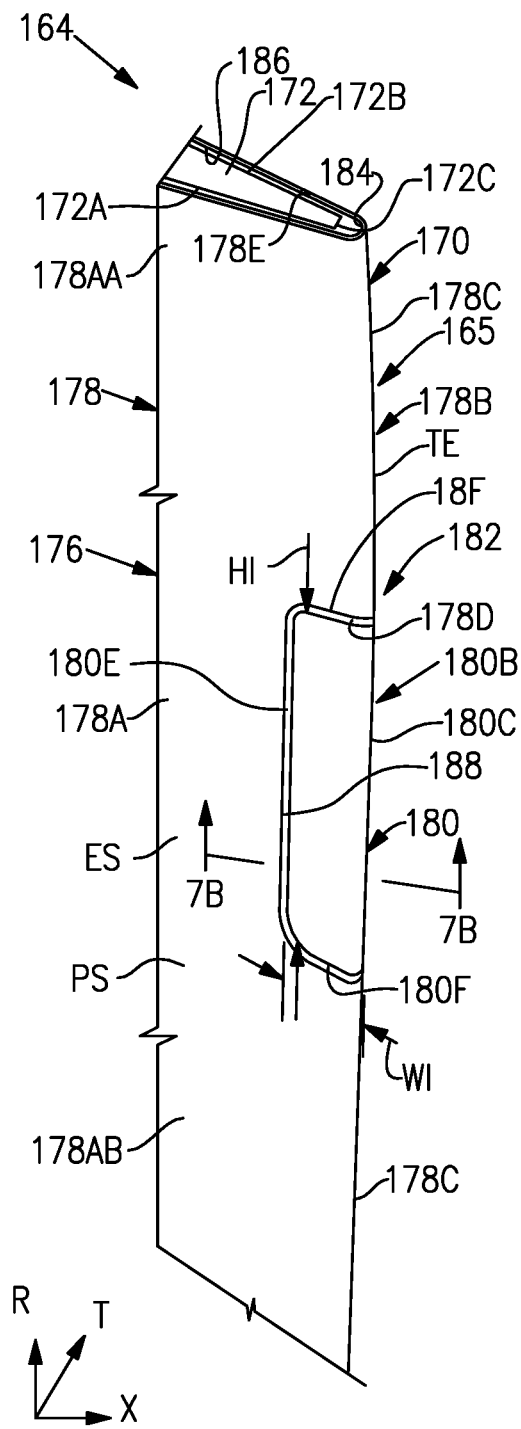
FIG. 5A illustrates a perspective view of the joint of FIG. 3.
FIG. 5B illustrates a perspective view of the joint of FIG. 4.
Figure 8:
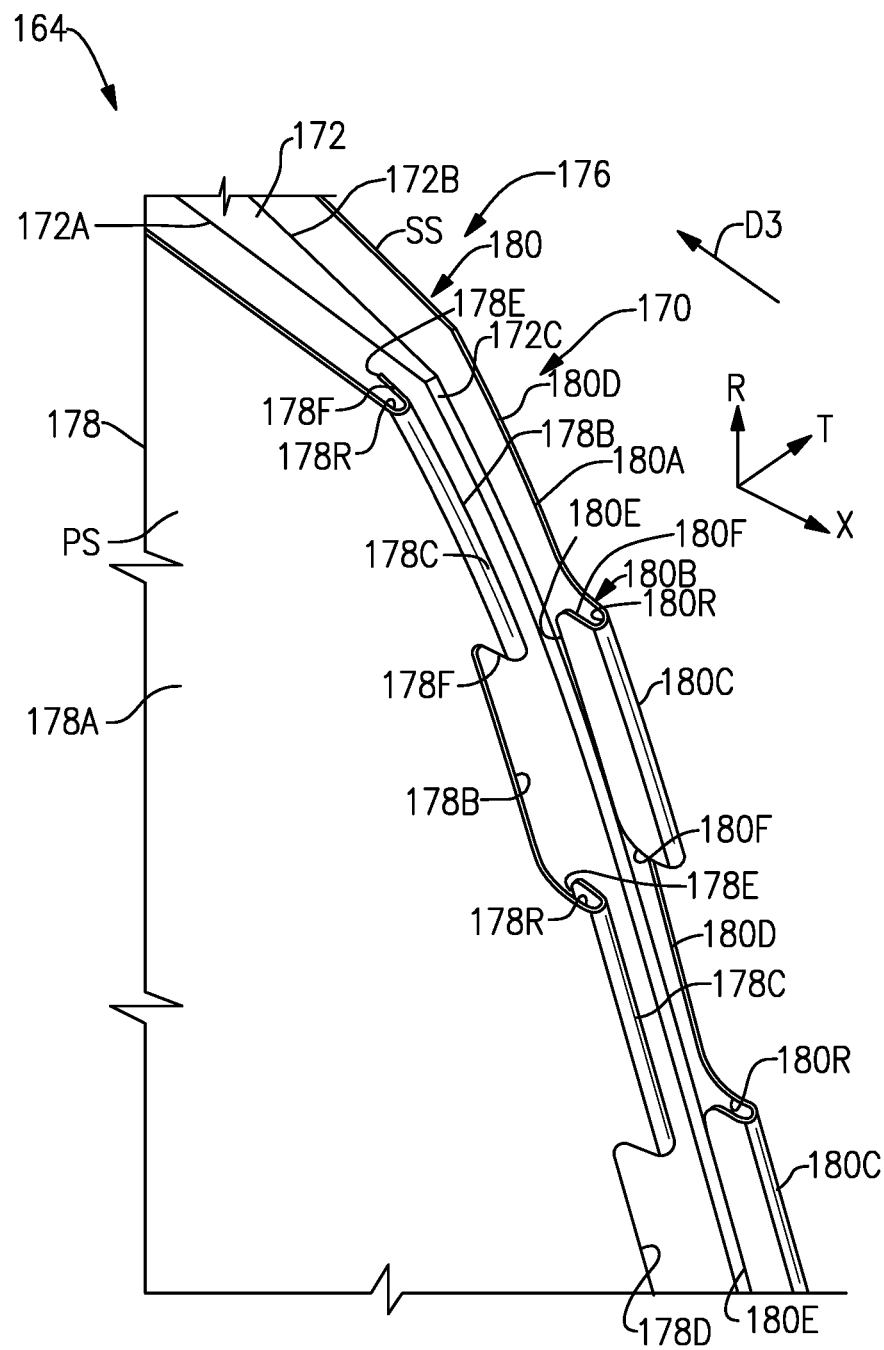
FIG. 8 illustrates an exploded view of the tip cap of FIG. 3.

Referring to FIGS. 5A-5B, with continuing reference to FIGS. 3-4, the first cap body 178A is dimensioned to extend along a first face 172A of the airfoil body 172, and the second cap body 180A is dimensioned to extend along a second face 172B of the airfoil body 172. The first face 172A is opposed to the second face 172B. The first face 172A extends along the pressure side PS, and the second face 172B extends along the suction side SS. In other examples, an opposite arrangement is utilized. The first and second faces 172A, 172B are dimensioned to taper inwardly towards and are joined at an edge 172C of the airfoil body 172. The edge 172C has a generally planar geometry or face having a major component extending in the radial direction R along the trailing edge TE, as illustrated by FIG. 8. In other examples, the edge 172C tapers to a vertex.

Each cap body 178A/180A includes a respective first body portion 178AA/180AA and a second body portion 178AB/180AB. The second body portion 178AB/180AB extends transversely from the respective first body portion 178AA/180AA. Each first body portion 178AA, 180AA has a major component dimensioned to extend in the chordwise direction X along the tip portion 170, as illustrated in FIGS. 3-4. The airfoil body 172 is at least partially exposed along the terminal end of the airfoil section 165. In other examples, the sheath 174 and/or tip cap 176 enclose the airfoil body 172 along the terminal end of the airfoil section 165. Each second body portion 178AB, 180AB has a major component dimensioned to extend in the spanwise direction R along the trailing edge TE. In other examples, the second body portions 178AB, 180AB are omitted.

Each cap body 178A, 180A including the second body portions 178AB, 180AB can be dimensioned to extend along various span positions of the airfoil section 165, such as at least a majority of span positions along the trailing edge TE. In the illustrative example of FIG. 3, each cap body 178A, 180A including the second body portions 178AB, 180AB extends inwardly from 100% span towards the root section 168, such as at least 50% or 75% span. The tip cap 176 can be spaced apart from the root section 168, as illustrated in FIG. 3. Other arrangements can be utilized. For example, the tip cap 176 can extend along the leading edge LE and tip portion 170, and the sheath 174 can extend from the tip portion 170 along the trailing edge TE.

The first and second cap portions 178, 180 mate or otherwise cooperate to establish at least one joint 182 along the external surface ES of the airfoil section 165. Utilizing the techniques disclosed herein, the joint 182 provides substantially continuous stiffness along adjacent portions of the airfoil body 172. The joint 182 can be dimensioned to extend along the tip portion 170, such as inwardly from the terminal end of the airfoil section 165 and along the trailing edge TE, as illustrated in FIGS. 3-4 and 5A-5B. In other examples, the joint 182 is spaced apart from the terminal end of the tip portion 170. The first and second cap portions 178, 180 can directly abut each other along the joint 182 or can define a relatively small gap to accommodate design and manufacturing tolerances. Adhesive or another bonding material 188 can substantially fill a volume of the gap to establish a substantially continuous surface contour.

The first and second sheath portions 178, 180 include respective first and second interface portions 178B, 180B extending outwardly from the respective cap body 178A, 180A. The first interface portion 178B cooperates with the second interface portion 180B to establish the respective joint 182. The interface portions 178B, 180B arranged according to the techniques disclosed herein provide a structural connection between the cap portions 178, 180. In the illustrative example of FIGS. 4-6, the interface portions 178B, 180B are arranged such that the joint 182 is established along the external surface ES of both (or at least one) of the pressure and suction sides PS, SS.

The first and second interface portions 178B, 180B can be dimensioned to establish at least one joint 182 having a circuitous profile along the external surface ES of the airfoil section 165, as illustrated by the joint 182 of FIGS. 3-4 and 5A-5B. For the purposes of this disclosure, the term "circuitous" means a profile having two or more points of inflection. The circuitous profile can reduce structural stiffness discontinuities that may otherwise degrade a structural integrity of the airfoil 164 due to FOD impacts.

The first interface portion 178B includes a first set of interface members (or fingers) 178C extending outwardly from the first cap body 178A. The second interface portion 180B includes a second set of interface members (or fingers) 180C extending outwardly from the second cap body 180A. The interface members 178C, 180C can be dimensioned to extend at various positions and orientations relative to the airfoil body 172, and can have various shapes and/or sizes. In the illustrative example of FIGS. 3-4 and 5A-5B, the interface members 178C, 180C have a major component that extends in the chordwise direction X. Various quantities of interface members 178C, 180C can be utilized. In the illustrative example of FIGS. 3-4, the first interface portion 178B has a quantity of eight interface members 178C, and the second interface portion 180B has a quantity of seven interface members 180C. However, fewer or more than eight interface members 178C and seven interface members 180C can be utilized.

The interface members 178C, 180C are arranged in a row along the edge 172C of the airfoil body 172 to establish the trailing edge TE of the airfoil section 165. The first set of interface members 178C and the second set of interface members 180C can have complementary, interlocking profiles and are interleaved with each other to establish the respective joint 182. In the illustrative example of FIGS. 5A-5B and 8, each interface member 178C/180C is an elongated finger or protrusion dimensioned to extend outwardly from a base along the cap body 178A/180A to a respective terminal end 178E/180E. The interface members 178C, 180C can be dimensioned to extend outwardly from the respective first body portion 178AA, 178AB and/or second body portion 180AA, 180AB, as illustrated in FIGS. 5A-5B.

The interface portions 178B, 180B are dimensioned to establish the joint 182 having a circuitous profile along the edge 172C of the airfoil body 172 joining the first and second faces 172A, 172B. The circuitous profile of the joint 182 has a plurality of segments extending between the pressure and suction sides PS, SS at respective span positions of the trailing edge TE that are established by an outer periphery of the interface members 178C, 180C, as illustrated by FIGS. 3-4 and 5A-5B. For example, the interface members 178C, 180C can be arranged such that the joint 182 extends across the trailing edge TE a total of fourteen times at different span positions of the airfoil section 165 with respect to the radial direction R due to the interleaving of the interface members 178C, 180C, as illustrated by FIGS. 3-4. The interface members 178C, 180C can substantially or completely define a height of the tip cap 176 along the trailing edge TE, as illustrated in FIGS. 3-4, which can improve a total area of protection adjacent the edge 172C of the airfoil body 172.

Figure 7A:
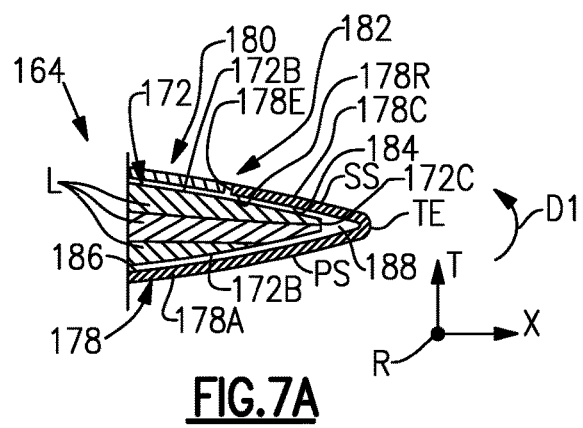
FIG. 7A illustrates an interface member taken along line 7A-7A of FIG. 5B.
Figure 7B:
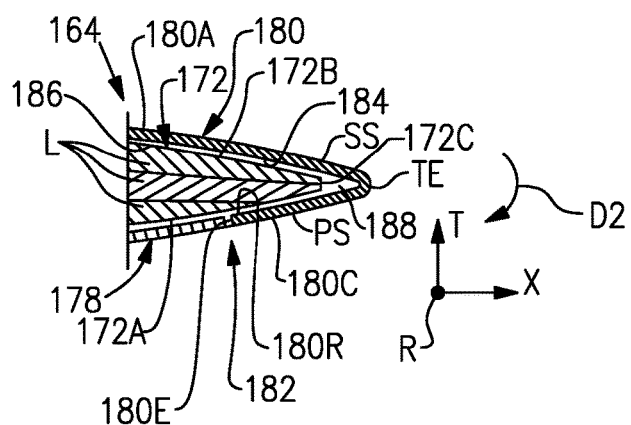
FIG. 7B illustrates an interface member taken along line 7B-7B of FIG. 5A.

The interface members 178C, 180C can have various geometries. In the illustrative example of FIGS. 5A-5B, 7A-7B and 8, each interface members 178C/180C is an elongated tab having a generally J-shaped or hook-shaped cross sectional geometry or profile including a first portion having a major component extending from a respective one of the cap bodies 178A/180A toward the trailing edge TE and including a second portion having a major component extending from the first portion toward the leading edge LE and terminating at the respective terminal end 178E/180E. The first portion is opposed to the second portion to establish a respective recess 178R/180R dimensioned to receive a portion of the airfoil body 172 along the edge 172C. The interface members 178C are dimensioned to extend from the cap body 178A along the first face 172A, wrap in a first direction D1 about the edge 172C along the trailing edge TE, and extend along the second face 172B, as illustrated in FIG. 7A. The interface members 180C are dimensioned to extend from the cap body 180A along the second face 172B, wrap in a second direction D2 about the edge 172C, and extend along the first face 172A, as illustrated in FIG. 7B. The second direction D2 is generally opposed to the first direction D1.

As illustrated by FIGS. 5A-5B and 8, sidewalls 178F/180F of the respective interface members 178C/180C can have a flat or substantially linear geometry. The terminal ends 178E/180E of the respective interface members 178C/180C can have various geometries, such as a substantially flat or linear geometry, for example, which can serve to increase an effective length of the respective joint 182. A junction between the sidewalls 178F/180F and the respective terminal end 178E/180E can be rounded, which can serve to increase an effective length of the respective joint 182 and reduce stress concentrations in the airfoil body 172 that may be otherwise caused by abrupt changes along the joint 182.

Interleaving the interface members 178C, 180C according to the techniques disclosed herein can provide a stiffness continuous transition between the cap portions 178, 180 and can establish a substantially continuous stiffness joint 182, which can serve to oppose out-of-plane bending loads, improve load transfers and reduce a likelihood of localized, inter-laminar stress concentrations and delamination of the composite plies or layers L (FIGS. 6 and 7A-7B) that may otherwise occur due to FOD impacts. Interleaving the interface members 178C, 180C can also occur without an increased weight as compared to a linear butt joint.

The interface members 178C, 180C can be dimensioned to establish a predefined stiffness adjacent to the joint 182. In the illustrative example of FIGS. 5A-5B, each interface member 178C/180C extends a width W1 between the trailing edge TE and the respective terminal end 178E/180E and extends a height H1 between the respective sidewalls 178F/180F. In examples, a ratio of H1:W1 is at least about 1:1 or more narrowly at least about 2:1, such as between about 3:1 and about 4:1 for at least some, a majority, or all of the interface members 178C, 180C. In examples, the width W1 is approximately 0.25 inches or less, which can reduce a complexity of forming the interface members 178C, 180C.

The width W1 of the first set of interface members 178C can be the same or can differ from the width W1 of the second set of interface members 180C. For example, the width W1 of at least some (or each) of the first set of interface members 178C can be less than or greater than the width of at least some (or each) of the second set of interface members 180C. Dimensioning the interface members 178C, 180C utilizing the techniques disclosed herein can increase an effective length of the joint 182, which can improve strength along the joint 182 and stiffness of the airfoil 164 along adjacent portions of the airfoil body 172.

The interface portions 178B/180B define one or more respective slots or recesses 178D/180D between adjacent pairs of the interface members 178C/180C. The terminal ends 178E of the interface members 178C interfit with or are otherwise received in the respective recesses 180D established between the interface members 180C. Likewise, the terminal ends 180E of the interface members 180C interfit with or are otherwise received in the respective recesses 178D established between adjacent pairs of the interface members 178C. The terminal ends 178E/180E are received in the respective recesses 178D/180D of adjacent pairs of the interface members 178C/180C such that the interface members 178C are at least partially aligned with the interface members 180C relative to the chordwise direction X and/or relative to the radial direction R, as illustrated in FIGS. 3-4 and 5A-5B. The interface members 178C can be substantially flush with the interface members 180C along the respective joint 182, which can reduce aerodynamic discontinuities along the external surface ES of the airfoil section 165.

Figure 6:
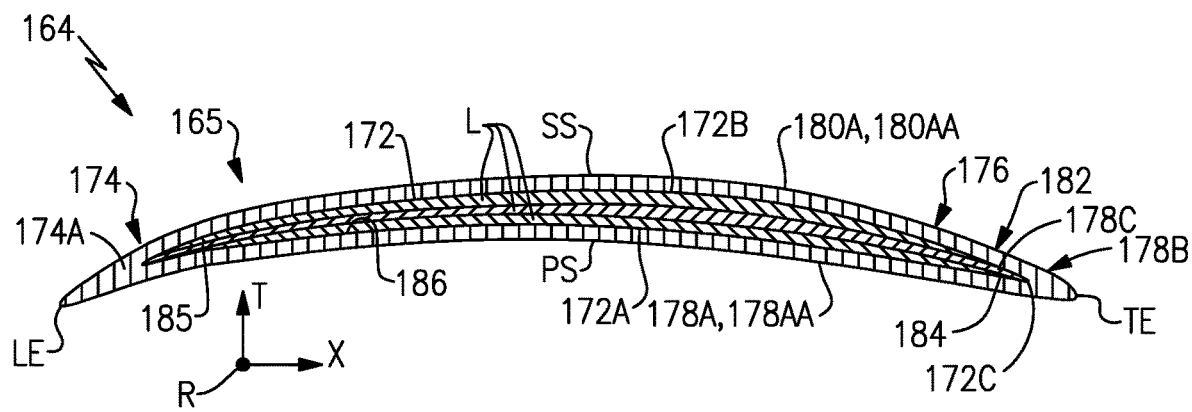
FIG. 6 illustrates a sectional view of the airfoil taken along line 6-6 of FIG. 4.

The interface members 178C, 180C are arranged in a row to establish an elongated groove 184 dimensioned to receive a portion of the airfoil body 172 along the edge 172C including a composite material, as illustrated by FIGS. 5A-5B and the composite layers L of FIG. 6. The recesses 178R, 180R are arranged to establish adjacent portions of the groove 184.

Referring to FIG. 6, the sheath 174 defines a first sheath cavity 185. The first cap member 178 and second cap member 180 of the tip cap 176 cooperate to establish a cap (or second sheath) cavity 186. The sheath cavity 185 is dimensioned to receive a portion of the airfoil body 172 along the leading edge LE such that the sheath 174 extends in the spanwise direction R along both the pressure and suction sides PS, SS. The cap cavity 186 is dimensioned to receive another portion of the airfoil body 172 along the tip portion 170 and trailing edge TE such that the tip cap 176 extends in the chordwise direction X along both the pressure and suction sides PS, SS. The sheath 174 and tip cap 176 serve to encapsulate the airfoil body 172 along the leading and trailing edges LE, TE and tip portion 170, with the airfoil body 172 sandwiched between the row of interface members 178C, 180C, as illustrated by FIGS. 7A-7B and 6. The sheath 174 and tip cap 176 form structural closeouts that suppress impact force induced inter-laminar stresses that may otherwise cause matrix cracking or delamination in the underlying laminate composite structure of the airfoil body 172.

Various materials can be utilized to construct the sheath 174 and cap portions 178, 180 of the tip cap 176, including any of the materials disclosed herein. In the examples, the sheath 174 and/or tip cap 176 are metallic. In examples, the first and second cap portions 178, 180 are formed from a sheet metal body and contoured to a predefined geometry. Various features including the interface members 178C, 180C can be machined from the sheet metal body.

The airfoil 164 can be assembled as follows. The sheath 174 is secured to a portion of the airfoil section 165, such as along the leading edge LE, as illustrated in FIGS. 3-4 and 6. The tip cap 176 is secured to another portion of the airfoil section 165, such as along the tip portion 170 and trailing edge TE as illustrated in FIGS. 3-4 and 6. The sheath 174 and tip cap 176 are secured to the airfoil section 165 such that the first set of interface members 178C are interleaved with the second set of interface members 178C to establish at least one joint 182 along the external surface ES of the airfoil section 165, as illustrated by FIGS. 3-4 and 5A-5B.

Securing the tip cap 176 can include moving the first and second cap portions 178, 180 of the tip cap 176 in a direction D3 (FIG. 8) such that at least a portion of the airfoil body 172 including the edge 172C are inserted into and received by the recesses 178R, 180R, as illustrated in FIGS. 7A-7B. The cap portions 178, 180 can be secured to the first and second faces 172A, 172B and edge 172C utilizing various techniques, such as fastening or bonding with an adhesive or epoxy material 188 (FIGS. 5A-5B and 7A-7B). In examples, the material 188 is a film adhesive deposited on the airfoil body 172 and/or cap portions 178, 180, and the airfoil 164 is positioned in an autoclave to cure the adhesive. The interface members 178C, 180C cooperate to substantially or completely encapsulate the airfoil body 172 along the trailing edge TE, as illustrated by FIGS. 5A-5B, 6 and 7A-7B. In an installed position, the interface members 178C, 180C are dimensioned to establish a substantially continuous external surface ES contour along the pressure and suction sides PS, SS of the airfoil section 165.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil for a gas turbine engine comprising:
   an airfoil section extending between a leading edge and a trailing edge in a chordwise direction and extending between a tip portion and a root section in a spanwise direction, and the airfoil section defining pressure and suction sides separated in a thickness direction;
   a sheath including first and second sheath portions secured to an airfoil body of the airfoil section;
   wherein the first sheath portion includes a first sheath body and a first set of interface members, the first sheath body extends along a first face of the airfoil body, and the first set of interface members extend from the first sheath body and along a second face of the airfoil body;
   wherein the second sheath portion includes a second sheath body and a second set of interface members, the second sheath body extends along the second face, and the second set of interface members extend from the second sheath body and along the first face such that the second set of interface members are interleaved with the first set of interface members to establish a joint having a circuitous profile along the trailing edge of the airfoil body joining the first and second faces; and
   wherein terminal ends of the first set of interface members are received in respective recesses between adjacent pairs of the second set of interface members such that the first set of interface members are at least partially aligned with the second set of interface members relative to the chordwise direction and relative to the radial direction along the trailing edge.

2. The airfoil as recited in claim 1, wherein the airfoil body comprises a composite material.

3. The airfoil as recited in claim 1, wherein the first and second sheath portions are metallic.

4. The airfoil as recited in claim 1, wherein the joint is established along an external surface of the airfoil section.

5. The airfoil as recited in claim 1, wherein each of the first and second sheath bodies includes a first body portion and a second body portion extending transversely from the first body portion, the first body portion has a major component extending in the chordwise direction along the tip portion, and the second body portion has a major component extending in the spanwise direction along the trailing edge, and the first and second sets of interface members extend outwardly from the respective second body portion.

6. The airfoil as recited in claim 1, wherein the pressure side comprises the first face, the suction side comprises the second face, and the joint is established along the trailing edge.

7. The airfoil of claim 6, wherein the circuitous profile has a plurality of segments extending between the pressure and suction sides at respective span positions of the trailing edge.

8. The airfoil as recited in claim 7, wherein:
   the first and second sets of interface members have a hook-shaped geometry including a first portion extending from a respective one of the first and second sheath bodies toward the trailing edge and includes a second portion extending from the first portion toward the leading edge to establish a terminal end of the hook-shaped geometry, and the first portion is opposed to the second portion to establish a recess receiving a portion of the airfoil body along the trailing edge;
   the first and second sheath portions are opposed in the thickness direction to establish a sheath cavity that receives a portion of the airfoil body along the tip portion; and
   the first sheath body establishes one of the pressure and suction sides, and the second sheath body establishes another one of the pressure and suction sides.

9. The airfoil as recited in claim 8, wherein:
   the airfoil is a fan blade;
   the airfoil body comprises a composite material; and
   the first and second sheath portions are metallic.

10. The airfoil as recited in claim 1, wherein the first and second sets of interface members have a hook-shaped geometry including a first portion having a major component extending from a respective one of the first and second sheath bodies toward the trailing edge and including a second portion having a major component extending from the first portion toward the leading edge, and the first portion is opposed to the second portion to establish a recess receiving a portion of the airfoil body along the trailing edge.

11. The airfoil as recited in claim 1, wherein:
the first and second sheath portions cooperate to establish a sheath cavity dimensioned to receive a portion of the airfoil body along the tip portion; and
the first and second sheath portions cooperate to establish the pressure and suction sides.

12. The airfoil as recited in claim 1, wherein the airfoil is a fan blade.

13. A gas turbine engine comprising:
a fan section including a fan having a fan hub carrying a plurality of fan blades;
a turbine section including a fan drive turbine rotatably coupled to the fan;
a compressor section driven by the turbine section;
wherein each fan blade of the plurality of fan blades includes an airfoil section extending between a leading edge and a trailing edge in a chordwise direction and extending between a tip portion and a root section in a spanwise direction, the airfoil section defining pressure and suction sides separated in a thickness direction, and includes a sheath having first and second sheath portions extending along an airfoil body of the airfoil section;
wherein the first sheath portion includes a first interface portion, and the second sheath portion includes a second interface portion that cooperates with the first interface portion to establish a joint having a circuitous profile along the trailing edge of the airfoil body; and
wherein the first interface portion includes a first set of interface members dimensioned to wrap in a first direction about the edge of the airfoil body adjacent the trailing edge, and the second interface portion includes a second set of interface members dimensioned to wrap in a second direction about the edge of the airfoil body such that the second set of interface members are interleaved with the first set of interface members to establish the joint.

14. The gas turbine engine as recited in claim 13, wherein the first and second sheath portions cooperate to establish a sheath cavity dimensioned to receive a portion of the airfoil body.

15. The gas turbine engine of claim 13, wherein the airfoil body comprises a composite material received in an elongated groove established by the first and second sets of interface members, and the first and second sheath portions are metallic.

16. The gas turbine engine of claim 13, wherein the circuitous profile has a plurality of segments extending between the pressure and suction sides at respective span positions of the trailing edge.

17. A method of assembly for an airfoil comprising:
securing a first sheath portion to a first face of an airfoil section, the first sheath portion including a first set of interface members;
securing a second sheath portion to a second face of the airfoil section such that a second set of interface members of the second sheath portion are interleaved with the first set of interface members to establish a joint along an edge of the airfoil section joining the first and second faces; and
wherein the first set of interface members include a first set of recesses, the second set of interface members include a second set of recesses, the step of securing the first sheath portion includes inserting a portion of an airfoil body into the first set of recesses, and the step of securing the second sheath includes inserting the portion of the airfoil body into the second set of recesses.

18. The method as recited in claim 17, wherein the edge is a trailing edge of the airfoil section, the first and second interface members cooperate to substantially encapsulate an airfoil body along the trailing edge of the airfoil section, the airfoil body comprises a composite layup at least partially received in an elongated groove established by the first and second sets of interface members, and the first and second sheath portions are metallic.

19. The method as recited in claim 17, wherein the first and second sets of interface members establish an external surface contour along pressure and suction sides of the airfoil section.

20. The method as recited in claim 17, wherein the airfoil section extends in a chordwise direction between leading and trailing edges, and the joint is established along the trailing edge.

* * * * *